United States Patent [19]

Gish

[11] 3,864,734

[45] Feb. 4, 1975

[54] PULSE-CODE MODULATION DETECTOR AND EQUALIZER

[75] Inventor: David B. Gish, Pasadena, Calif.

[73] Assignee: Bell & Howell Company, Chicago, Ill.

[22] Filed: Jan. 5, 1973

[21] Appl. No.: 321,198

[52] U.S. Cl. .................................... 360/41, 360/46

[51] Int. Cl. .......................................... G11b 5/09

[58] Field of Search ........... 325/321; 340/174.1 G, 325/174.1 H; 360/40, 41, 46

[56] References Cited

UNITED STATES PATENTS

| | | | |
|---|---|---|---|
| 3,516,066 | 6/1970 | Jacoby | 340/174.1 H |
| 3,597,751 | 8/1971 | Heidecker | 340/174.1 H |
| 3,603,945 | 9/1971 | Hertrich | 340/174.1 H |
| 3,631,424 | 12/1971 | Regitz | 340/174.1 H |
| 3,641,524 | 2/1972 | Norris | 340/174.1 H |
| 3,689,903 | 9/1972 | Agrawela | 340/174.1 H |
| 3,735,372 | 5/1973 | Coccagne | 340/174.1 H |

*Primary Examiner*—Vincent P. Canney
*Attorney, Agent, or Firm*—Benoit Law Corporation

[57] ABSTRACT

An apparatus for recovering pulse-code modulated digital data from a readback signal has equipment for partially equalizing the readback signal, and equipment for completing the partial equalization of the readback signal and for detecting the digital data. The latter equipment includes a delay device for delaying the partially equalized readback signal, equipment for providing a relatively undelayed version of the readback signal, and a differential amplifier for providing a digital signal corresponding to the difference between the delayed readback signal and the relatively undelayed version of the readback signal. The delay device includes a filter for completing the above mentioned partial equalization with the aid of the equipment for providing the relatively undelayed version of the readback signal and the mentioned differential amplifier.

7 Claims, 5 Drawing Figures

PATENTED FEB 4 1975

3,864,734

SHEET 4 OF 4

PULSE-CODE MODULATION DETECTOR AND EQUALIZER

CROSS-REFERENCE TO RELATED APPLICATIONS

The invention herein described was made in the course of or under a contract or subcontract thereunder with the Department of Defense.

The subject patent application is related as to subject matter to the following copending patent applications which are assigned to the subject assignee and are herewith incorporated by reference herein:

Patent application Ser. No. 278,137, filed Aug. 4, 1972, by William H. Spencer;

Patent application Ser. No. 278,138, filed Aug. 4, 1972, by John L. Way; and

Patent application Ser. No. 321,197, filed of even date herewith by John L. Way. This latter John Way application is a continuation-in-part of the aforesaid John Way application Ser. No. 278,138.

BACKGROUND OF THE INVENTION

1. Field of the Invention

The subject invention relates to the field of pulse code modulation and, more particularly, to the recovery of pulse-code modulated digital data from a readback signal and to the equalization of that readback signal.

2. Description of the Prior Art

Existing equipment for recovering pulse-code modulated digital data from a readback signal and for equalizing the readback signal effect the equalization and the detection in different stages. The equalizer stage included equipment for an exact and complete frequency and phase equalization employing resonant circuits. This led to a number of interacting adjustments which complicated the set-up of the system. These problems were further aggravated in the case of speedswitch systems permitting different playback velocities.

SUMMARY OF THE INVENTION

It is a general object of this invention to overcome the above mentioned disadvantages.

It is an object of this invention to provide apparatus for recovering pulse-code modulated digital data from a readback signal.

It is a related object of this invention to provide apparatus for equalizing readback signals while recovering pulse-code modulated digital data therefrom.

It is an object of this invention to eliminate resonant circuit equalization in apparatus of the above mentioned type.

It is an object of this invention to reduce the set-up time in apparatus of the above mentioned type.

It is an object of this invention to eliminate the need for a direct-current restorer in apparatus of the above mentioned type.

It is an object of this invention to simplify significantly the circuitry and the operation of equalizing components in apparatus of the above mentioned type.

Other objects will become apparent in the further course of this disclosure.

The subject invention resides in apparatus for recovering pulse-code modulated digital data from a readback signal and, more specifically, in the improvement comprising, in combination, means for partially equalizing the readback signal comprising low-frequency equalizing means, mid-frequency equalizing means, and partial high-frequency equalizing means including only RC filter means as passive filter means and means connected to said partial equalizing means for completing the partial equalization of the readback signal and for detecting the data, including means for delaying the partially equalized readback signal, means for providing a relatively undelayed version of the readback signal, and means for providing a digital signal corresponding to the difference between the delayed readback signal and the relatively undelayed version of the readback signal. According to the invention, the delay means include further filter means including only RC filters as passive filter means for completing the partial equalization of the readback signal with the aid of the mentioned means for providing the undelayed version of the readback signal and the mentioned means for providing the difference signal.

In accordance with a preferred embodiment of the subject invention, the above mentioned means for providing the undelayed version include means connected to the partial equalizing means for providing a relatively undelayed version of the partially equalized readback signal, and the above mentioned means for providing the difference signal include means, connected to the filter means included in the delay means and to the means for providing a relatively undelayed version of the partially equalized readback signal, for providing a digital signal corresponding to the difference between the delayed readback signal and the relatively undelayed version of the partially equalized readback signal.

Readback signal detection methods in which the readback signal is delayed and is combined with the original readback signal in a differential amplifier have been proposed before, as may be seen from Byer, Digital Magnetic Tape Recording Principles and Computer Applications (Hayden Book Company), pp. 116 and 117. However, the subject invention substitutes means for partially equalizing the readback signal for the prior-art means for effecting a complete and exact phase and frequency equalization, and further adds to these partial equalizing means delay means, means for providing an undelayed signal version, and means for providing a difference signal for completing the partial equalization and, at the same time, recovering pulse-coded modulated digital data from the readback signal.

BRIEF DESCRIPTION OF THE DRAWINGS

The subject invention will become more readily apparent from the following detailed description of preferred embodiments thereof, illustrated by way of example in the accompanying drawings in which like reference numerals designate like or functionally equivalent parts, and in which:

FIGS. 2 and 3 are positioned for a complete showing of the apparatus depicted thereon.

DESCRIPTION OF PREFERRED EMBODIMENTS

Figure 1:
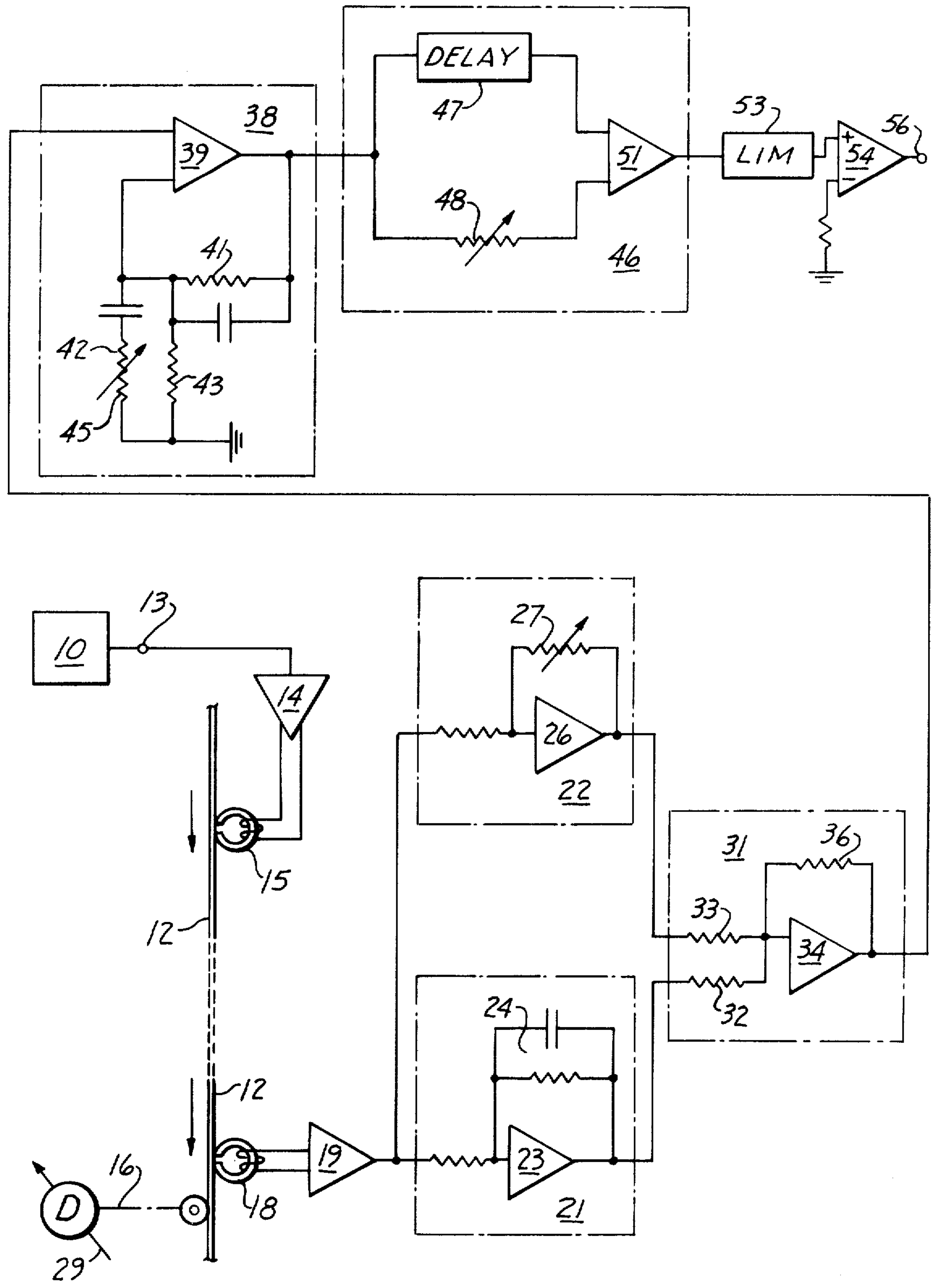
FIG. 1 is a block diagram of an apparatus for recovering pulse-code modulated digital data from a readback signal in accordance with a preferred embodiment of the subject invention.

FIG. 1 has a block 10 representing a source of digital data. By way of example, and not by way of limitation, this source may be a source of NRZ (non-return to zero) data to be recorded on a magnetic recording tape 12. By way of further example, the source 10 may include the data enhancer systems disclosed in the above mentioned patent applications or patents by John L. Way. Briefly, the Way systems provide enhanced NRZ data including parity bits in addition to data bits.

As shown in FIG. 1, the NRZ or other binary data provided by the source 10 are applied to an input terminal 13 of a recording amplifier 14 for a recording of these data, by means of a magnetic recording head 15, on a magnetic recording tape 15 which is advanced by a tape drive 16 relative to the recording head 15. It will, of course, be understood that magnetic recording of binary data is shown by way of example and not by way of limitation. If desired, the binary data may be recorded on photographic film with the aid of modulated light-emitting recording devices, or on any other desired recording medium.

For a readback of the recorded data, the recording tape 12 is advanced by the tape drive 16, past a magnetic readback head 18. The readback signal is amplified by a readback preamplifier 19 of a conventional design.

The readback signal at the output of the preamplifier 19 suffers from differentiation effects, high-frequency losses, direct-current baseline shift, and phase distortion. Correction for low-frequency differentiation may be effected by integrating a portion of the readback signal and by adding such integrated portion to an amplified version of the readback signal. To this effect, the preamplified readback signal is applied to an integrating stage 21 for low-frequency equalization, and to a mid-frequency gain stage 22 for mid-band gain adjustment.

The integrating stage 21 comprises an operational amplifier 23 and an RC network 24 connected in a feedback path of the amplifier 23. The mid-frequency gain stage 22 comprises an amplifier 26 having an adjustable feedback path 27. In practice, the adjustable feedback path 27 may be switched together with a switching of the speed of the tape 12 if the tape drive 16 has a speed switching feature as indicated by the arrow 29 in FIG. 1.

A summing stage 31 comprising summing resistors 32 and 33 and an operational amplifier 34 with feedback resistor 36 is employed to combine the outputs of the stages 21 and 22.

A partial high-frequency equalization stage 38 is provided after the summing stage 31. The partial high-frequency equalization stage 38 comprises an operational amplifier 39 having a feedback path 41 with a series-connected RC network 42 having differentiator characteristics. The RC network 42 has a resistor 43 connected in parallel thereto and is grounded at one side. The RC network 42 has an adjustable resistance 45 that may be varied in conjunction with a switching of the speed of advance of the tape 12.

The partially equalized signal is applied to a differencing stage 46. This differencing stage has a time delay network 47 for delaying the partially equalized signal by one-half bit time of the binary data contained therein. A gain trim resistor 48 is connected in parallel to the delay network 47. The variable resistor 48 does not delay the partially equalized signal, but provides for a gain setting which is typically effected at the factory and which compensates for high-frequency attenuation in the delay network 47. It will be noted that the component 48 serves to provide a relative undelayed version of the partially equalized readback signal. The differencing stage 46 also includes a differential amplifier 51 for differentially amplifying the delayed and non-delayed signals received from the delay network 47 and from the gain trim resistor 48, respectively.

The differencing stage 46 operates as a detector of the readback signal, the basic nature and operation of which are known from the above mentioned book by Byer. The differential amplifier 51 will have a positive or a negative output signal, according to whether the played-back signal is increasing or decreasing.

The output signal of the differential amplifier 51 is applied to a limiter 53 which is connected to the differential stage 46 and which serves to increase the dynamic range of the stage 46. The limited signal is processed by a comparator 54 and is then applied to a systems output terminal 56. The output signal at 56 is a digital signal corresponding to the difference between the readback signal delayed at 47 and the relatively undelayed version provided by way of the gain trim resistor 48.

The signal at terminal 56 is completely equalized and includes the data provided by the source 10 prior to recording.

Figure 2:
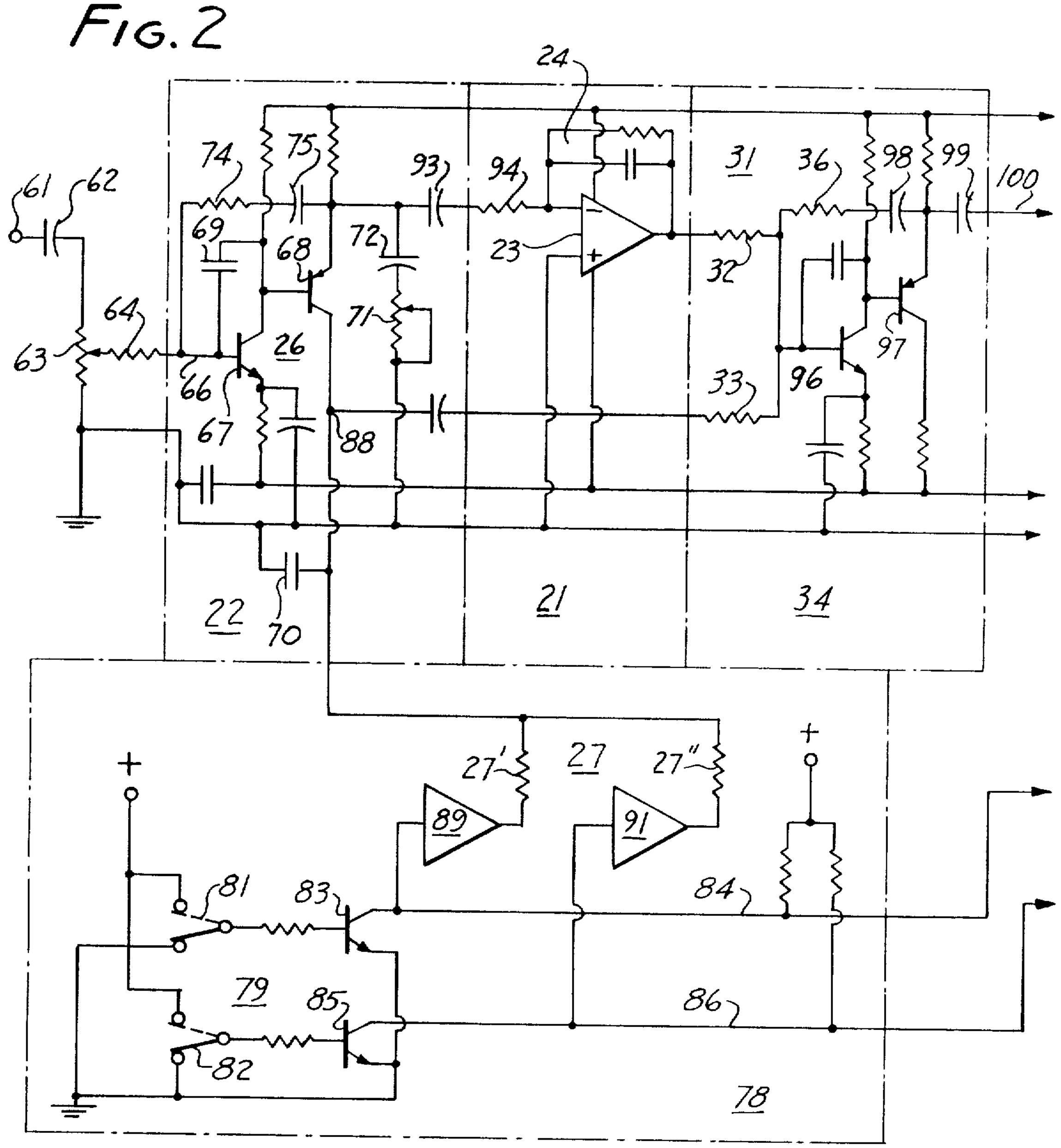
FIGS. 2 and 3 are circuit diagrams of an apparatus of the type shown in FIG. 1, in accordance with a preferred embodiment of the subject invention.
Figure 4:
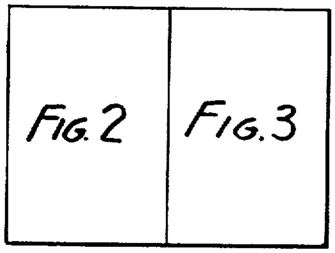
FIG. 4 is a diagram showing how the sheets containing
Figure 3:
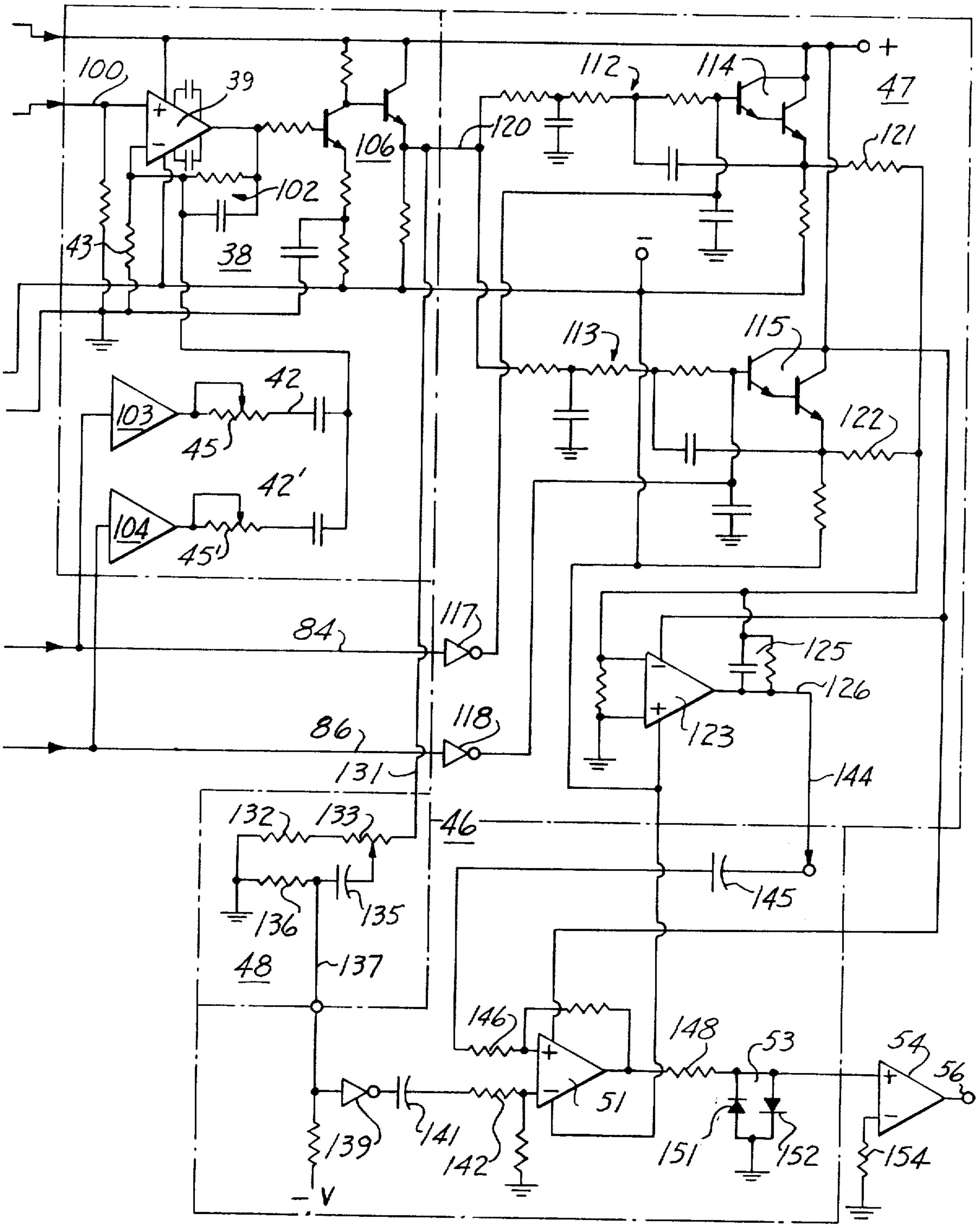

A practical preferred embodiment of the apparatus shown in FIG. 1 will now be disclosed with the aid of the circuit diagram of FIGS. 2 and 3.

The apparatus of FIGS. 2 and 3 has a systems input 61 for receiving a readback signal to be equalized and to be subjected to a recovery of pulse-code modulated digital data therefrom. For instance, the systems input 61 may be connected to the output of the reproduce preamplifier 19 shown in FIG. 1.

The readback signal received through the input 61 is applied by a coupling capacitor 62 to a variable resistor 63 for level adjustment purposes. A resistor 64 is connected to the wiper arm of the variable resistor or potentiometer 63 for applying the readback signal by way of a lead 66 to the amplifier 26 of the mid-frequency gain stage 22. The amplifier 26 has two transistors 67 and 68 connected as shown in FIG. 2. A capacitor 70 provides noise reduction outside the frequency range of interest. Oscillation is inhibited by a frequency compensation capacitor 69. A variable resistor 71 is connected by a capacitor 72 to the emitter of the transistor 68 for an adjustment of the gain of the amplifier 26. A feedback path of the amplifier 26 includes a resistor 74 and a blocking capacitor 75.

In FIG. 2, the adjustable feedback path 72 includes a resistor 27' which is connected in a speed switching circuit 78 which includes a bank of switches 79 for adapting the apparatus of FIGS. 2 and 3 to different speeds of the tape drive 16. In FIG. 2, only two speed selector switches 81 and 82 are shown for the purpose of illustration. The selector switches 81 and 82 are mutually exclusive in that only one of the switches can be actuated at a time. Conventional mechanical interlock systems (not shown) are readily available for this purpose.

A switching transistor 83 connects a lead 84 to ground when the switch 81 is actuated. Similarly, a switching transistor 85 connects a lead 86 to ground when the selector switch 82 is actuated.

In FIG. 2, the above mentioned resistor 27′ is connected between the output 88 of the amplifier 26 and a non-inverting buffer amplifier 89 which has its input connected to the lead 84. Similarly, a resistor 27″ is connected between the amplifier output 88 and a non-inverting buffer amplifier 91 whose input is connected to the lead 86. The gain of the mid-frequency gain stage 22 is determined by the resistor 27′ or by the different resistor 27″ depending on whether the switch 81 or the switch 82 is actuated in accordance with the prevailing speed setting of the tape drive 16.

A coupling capacitor 93 and a resistor 94 connect the inverting input of the operational amplifier 23 to the emitter of the transistor 68. Since there is no gain between the emitter of the transistor 68 and the input of the input 26, but merely a signal inversion, it follows that the operational amplifier 53 is, in effect, connected in parallel to the amplifier 26.

As mentioned above, the operational amplifier 23 is part of the integrating stage 21 and has the RC network 24 in a feedback path thereof. By way of example, the operational amplifier 23 may be of the type μA741.

The output of the amplifier 23 is connected to the summing resistor 32, while the output 88 of the amplifier 26 is connected to the summing resistor 33. The summing amplifier 34 has two transistors 96 and 97 connected as shown in FIG. 2. The previously mentioned resistor 36 is in a feedback path of the amplifier 34 which also includes a blocking capacitor 98.

A coupling capacitor 99 and lead 100 connect the output of the summing amplifier 34 in the summing stage 31 to the non-inverting input of the operational amplifier 39 in the partial high-frequency equalization stage 38. By way of example, the operational amplifier 39 may be of the type uA715. The partial high-frequency equalization stage includes an RC network 102 for high-frequency rolloff. The above mentioned series-connected RC network 42 is connected to a buffer amplifier 103 whose input is connected to the lead 84 of the speed selector circuit 78. The RC network 42 is operative when the selector switch 81 is actuated. On the other hand, actuation of the switch 82 brings into operation an RC network 42″, having an adjustable resistor 45′ and being connected to a buffer amplifier 104 whose input, in turn, is connected to the lead 86 of the speed selector circuit 78. A linear gain stage 106 is connected to the output of the operational amplifier 39.

It will be noted from FIG. 3 that the partial high-frequency equalization stage 38 comprises only RC filter means, and that resonant circuit equalization in all of the stages is strictly avoided. This eliminates the necessity of bothersome phase and Q adjustments which had to be effected in prior-art equipment.

Figure 5:
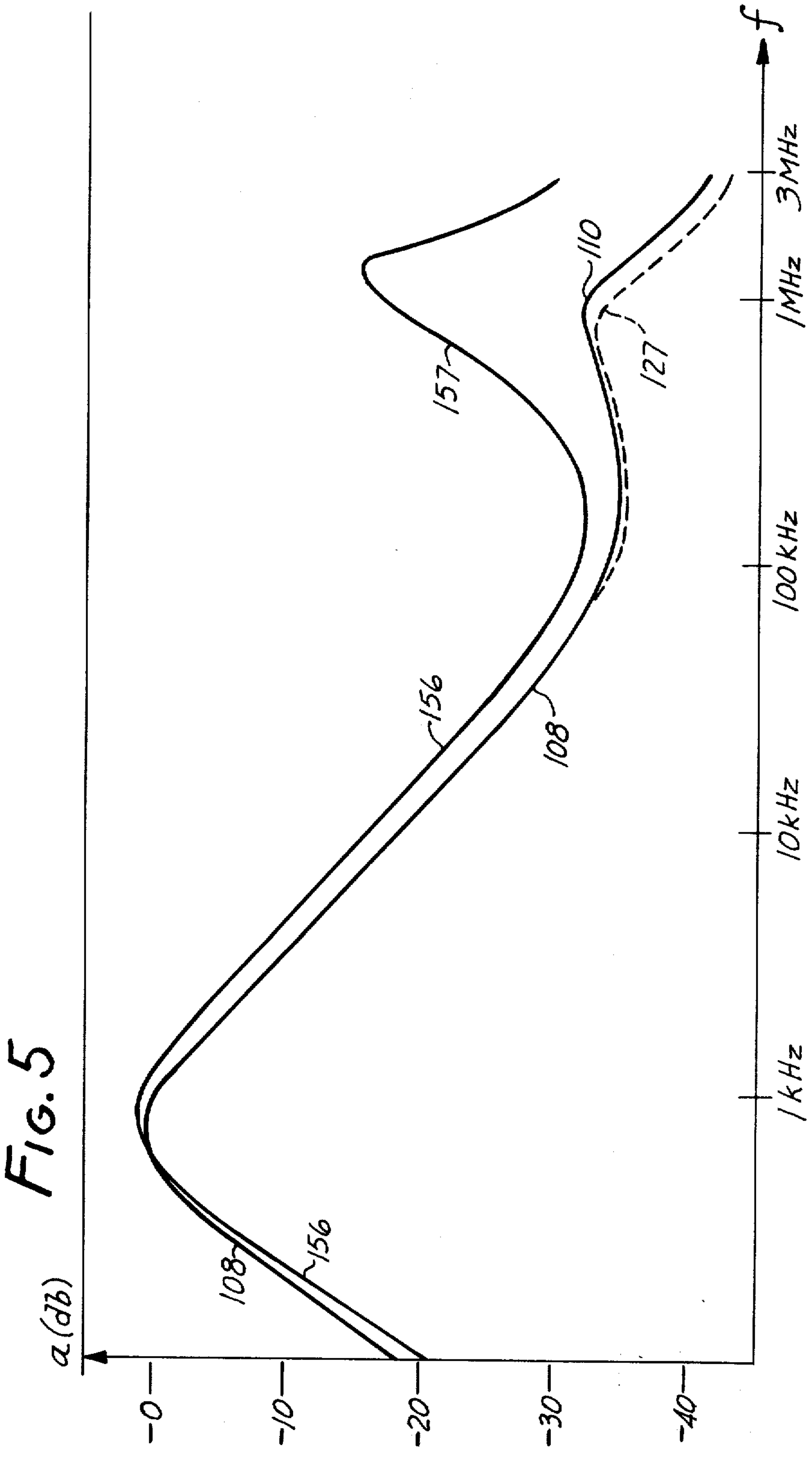
FIG. 5 is an amplitude-versus frequency plot for illustrating the operation of the apparatus shown in FIGS. 1 to 3.

Reference should now be had to FIG. 5 which shows a curve 108 obtained by plotting the output in decibel of the gain stage 106 as a function of readback signal frequency on a logarithmic scale. The curve 108 shows that the equalization provided by the stages 21, 22, 31 and 38 is only a partial equalization, in that the high-frequency area is insufficiently equalized as seen at 110. For a complete equalization (meaning herein an acceptable equalization for practical purposes of the readback signal) the differencing stage 46 is combined with the partial equalization stages in accordance with the subject invention.

In particular, the differencing stage 46 includes a delay network 47 which, in the illustrated preferred embodiments, includes two Bessel filters 112 and 113 having Darlington pairs 114 and 115 for preventing loading of the RC sections of the Bessel filters.

The Bessel filters 112 and 113 are speed switched in that the Bessel filter 112 is activated by way of the lead 84 and an inverter 117 when the speed selector switch 81 is actuated, and in that the Bessel filter 113 is activated by way of the lead 86 and an inverter 118 when the selector switch 82 is actuated.

The Bessel filters 112 and 113 have linear phase shift as a function of frequency. This prevents signal distortion and avoids cumbersome interdependent adjustments.

A lead 120 connects the output of the linear gain stage 106 to the Bessel filters 112 and 113. The output of the Bessel filters 112 and 113 is connected to summing resistors 121 and 122 for a combination of the different speed branches by a summing amplifier 123 which, by way of example, may comprise an operational amplifier of the same type as the operational amplifier 39.

Each Bessel filter 112 and 113 is designed to delay the partially equalized readback signal received from the linear gain stage 106 by an amount equivalent to one-half the cell period of the readback data. For instance, in the case of binary data the Bessel filters 112 and 113 are designed to delay the readback signal by a period corresponding to the duration of half a bit.

The summing or combining amplifier 123 has an RC network 125 connected in a feedback path to provide for a high-frequency rolloff beyond the passband for noise suppression purposes.

A high-frequency portion of the signal appearing at the output of the amplifier 123 of the delay device 47 is shown in FIG. 5 by the dotted curve 127. As far as the low and mid-frequency regions are concerned, the output signal of the delay device 47 generally follows the curve 108 shown in FIG. 5 and described above. It is thus seen that the delay device 47 with Bessel filter 112 or 113 and summing amplifier 123 does not by itself complete the equalization effected partially by the stages 21, 22, 31 and 38, and particularly by the stage 22 as far as the high-frequency region is concerned. Rather, the subject invention encompasses a true combination as the differential amplifier 51 and the branch including the gain trim 48 are necessary according to the illustrated preferred embodiments to complete the desired equalization in cooperation with the delay device 47.

A lead 131 connects the output of the linear gain stage 106 of the partial high-frequency equalizer stage 38 to the gain trim 48. In FIG. 3, the gain trim 48 comprises a potentiometer including a fixed resistor 132 and a variable resistor 133 connected in series between the output of the linear gain stage 106 and ground. A coupling capacitor 135 and a fixed resistor 136 are connected in series between the wiper of the variable resistor 133 and ground. A lead 137 connects a junction point between the capacitor 135 and the resistor 136 to the inverting input of the differential amplifier 51, by way of an inverter 139, a coupling capacitor 141 and a resistor 142. Similarly, a lead 144 connects the output 126 of the summing amplifier 123 of the delay device 47 to the non-inverting input of the differential amplifier 51 by way of a coupling capacitor 145 and a resistor 146. By way of example, the differential amplifier 51 may be an operational amplifier of the type LM318.

A resistor 148 connects the output of the differential amplifier 51 to the above mentioned limiter 53 which, in FIG. 3, includes a pair of back-to-back diodes 151 and 152 being grounded at one side. The output of the limiter is connected to the non-inverting input of the amplifier 54, which has its inverting input grounded by way of a resistor 154. The amplifier 54 preferably operates as a single-level detection amplifier or comparator which provides at the systems output 56 a square wave representing the digital or binary data in the readback signal as detected by the combination comprising the delay device 47, gain trim 48 and differential amplifier 51, operating as a differencing detector stage 46.

A curve 156 in FIG. 5 illustrates the amplitude of the output signal of the differential amplifier 51 as a function of frequency. As seen at the part 157 of the curve 156, the output of the differential amplifier 51 is heavily emphasized in the high-frequency region in sharp contradistinction to the output of the partial high-frequency equalization stage 38 or the output of the delay device 47 by itself.

The cooperation of the elements of the differencing stage 46 thus completes the equalization of the readback signal for most practical purposes without the need for complete equalization stages of a traditional type and especially without the need for cumbersome resonant circuits.

The data provided at the systems output 56 may be utilized in any desired manner. For instance, these data may be decoded and printed out or stored or displayed with a conventional device. In particular, the data provided at the systems output 56 may be applied to a bit synchronizer for a regeneration of clock pulses synchronized with the readback data. These data may also be subjected to a removal of parity bits, as desired. For instance, the data may be applied to a bit synchronizer of the type disclosed in the above mentioned second Way application or patent. Suitable decoder or parity bit removing equipment is disclosed in the above mentioned Spencer application or patent and in the above mentioned second Way patent application or patent.

Variations and modifications within the spirit anad scope of the subject invention will be apparent from the subject disclosure to persons skilled in the art.

I claim:

1. In apparatus for recovering pulse-code modulated digital data from a readback signal, the improvement comprising in combination:

means for partially equalizing said readback signal comprising low-frequency equalizing means, mid-frequency equalizing means, and partial high-frequency equalizing means including only RC filter means as passive filter means; and means connected to said partial equalizing means for completing said partial equalization of said readback signal and for detecting said data, including means for delaying said partially equalized readback signal, means for providing a relatively undelayed version of said readback signal, and means for providing a digital signal corresponding to the difference between said delayed readback signal and said relatively undelayed version of said readback signal, said delay means including further filter means including only RC filters as passive filter means for completing said partial equalization with the aid of said means for providing said undelayed version and said means for providing said difference signal.

2. An apparatus as claimed in claim 1, wherein:

said means for providing said undelayed version include means connected to said partial equalizing means for providing a relatively undelayed version of said partially equalized readback signal; and said means for providing said difference signal include means, connected to said further filter means included in said delay means and to said means for providing a relatively undelayed version of said partially equalized readback signal, for providing a digital signal corresponding to the difference between said delayed readback signal and said relatively undelayed version of said partially equalized readback signal.

3. An apparatus as claimed in claim 2, wherein:

said delay means include means for delaying said partially equalized readback signal by one-half the cell period of said digital data.

4. An apparatus as claimed in claim 1, wherein:

said delay means include means for delaying said partially equalized readback signal by one-half the cell period of said digital data.

5. An apparatus as claimed in claim 1, wherein:

said means for providing said digital signal include limiter means for increasing the dynamic range of said equalization completing means.

6. An apparatus as claimed in claim 1, wherein:

said further filter means of said delay means include Bessel filter means.

7. Apparatus as claimed in claim 1, wherein:

said means for providing a relatively undelayed version of said readback signal comprise variable resistor means.

* * * * *